a b c d

Fig. 6.
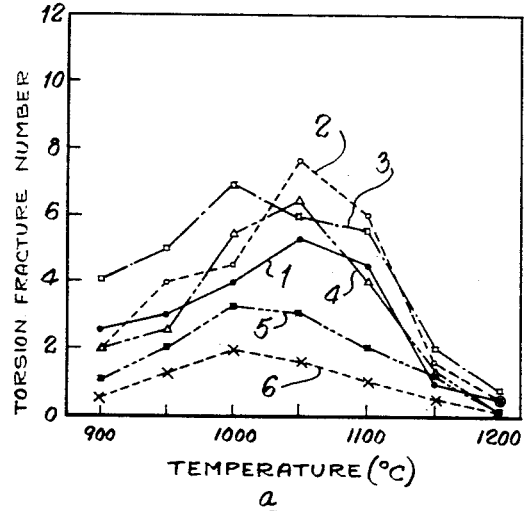
a
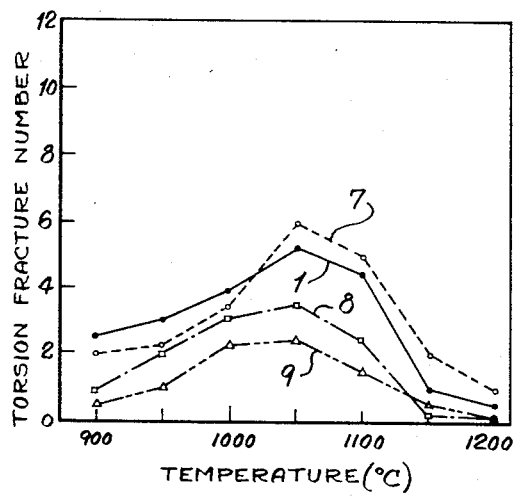
b
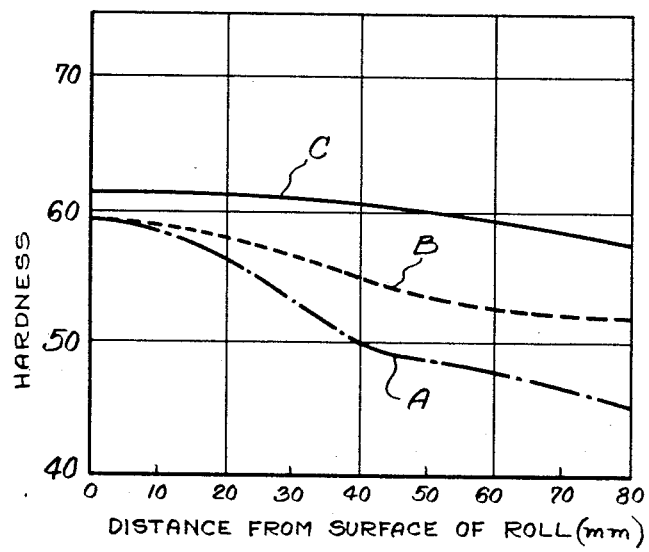
Fig. 7.

a b

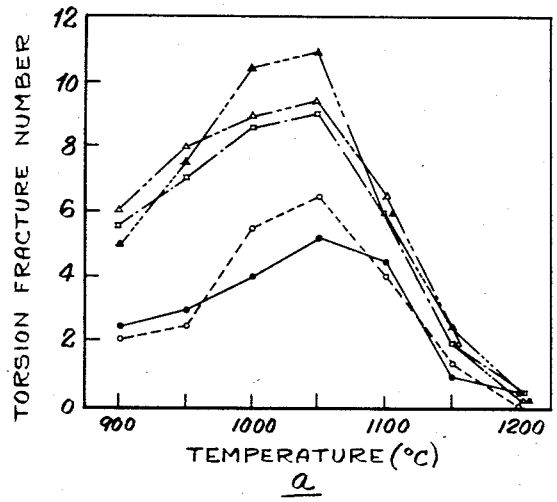
a
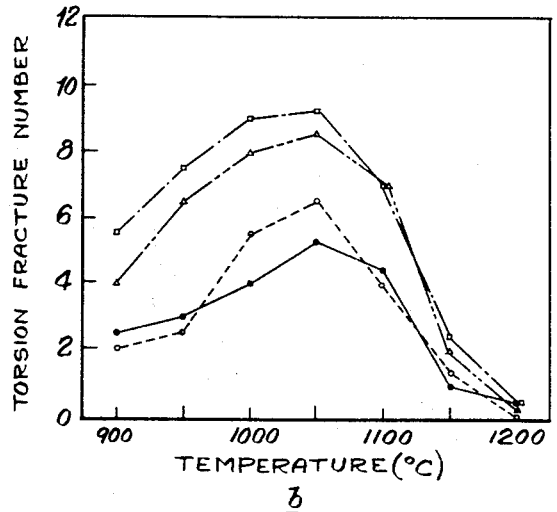
b
Fig.10.
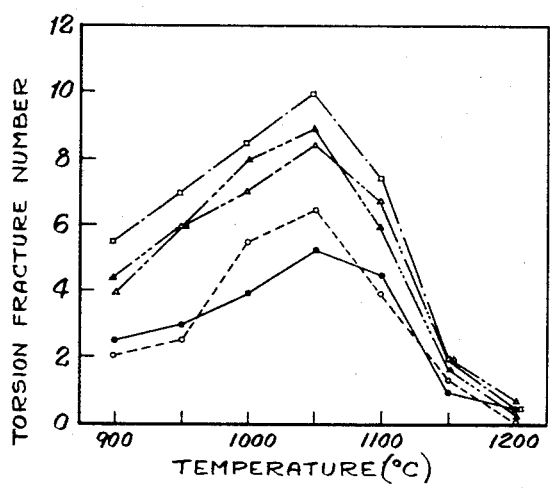

United States Patent Office 3,411,957
Patented Nov. 19, 1968

3,411,957
METHOD OF MANUFACTURING A
CAST IRON ROLL
Kiyoshi Takai and Fumio Hashimoto, Tokyo, and Yuichiro Sato and Kiyoshi Matsukura, Toyamashi, Japan, assignors to Nisso Seiko Kabushiki Kaisha, Tokyo, Japan
Filed Oct. 24, 1965, Ser. No. 504,431
Claims priority, application Japan, June 1, 1965, 40/31,919; June 23, 1965, 40/36,967, 40/36,968
11 Claims. (Cl. 148—2)

ABSTRACT OF THE DISCLOSURE

A process for the preparation of durable cast iron rolls which comprises preparing a casting containing 1.7–3.8% carbon, less than 2.5% silicon, at least one manganese, chromium, molybdenum, vanadium or tungsten alloying element in specified amounts, a cobalt or nickel mechanical-property improving material in specified amounts and less than a 0.20% total of phosphorous, sulfur, copper, tin, arsenic, lead, antimony, bismuth and zinc detrimental elements; hot working the casting at a temperature of 1125–900° C. after heating the casting to a temperature 50° lower than the solidus line; and heat-treating the hot-worked casting to obtain the required mechanical properties.

---

This invention relates to a manufacturing method for producing cast iron rolls having a carbon content within the cast iron structure range. It relates to a production method of cast iron rolls, which have finely distributed iron carbon compound namely cementite grains in the structure or in other cases have a special microscopic structure containing a very small amount of graphite grains. The rolls have superior mechanical and physical properties.

The purpose of this invention is to supply a practical production method for a cast iron roll which has properties such as strong toughness, wear resistance and resistance to heat cracking by distributing hard and brittle cementite as fine grains.

In properties required for a roll in general from the point of view of its application, there are strong toughness, wear resistance, resistance to heat cracking, resistance to spalling, feasibility for large angle of bite, and machinability.

In rolls which are being used as hot rolling rolls at present, there are cast steel series rolls such as cast steel rolls, special cast steel rolls, and graphite steel rolls and cast iron series rolls such as ordinary chilled rolls, alloy alloy chilled rolls, grain rolls, and alloy grain rolls and besides adamite rolls and ductile rolls. However there is a merit and disadvantage for any roll, and no roll which satisfies the three major conditions required for hot rolling roll, that is, strong toughness, wear resistance and resistance to heat cracking simultaneously, has been found so far. Generally cast steel series rolls have toughness due to their low carbon contents, for example 0.5–1.2%, however wear resistance is inferior to cast iron series rolls due to their low carbon contents. Particularly since the resistance to development of heat cracking formed on the roll surface during use is small, considerable deep heat cracks are developed, and from these fatigue fracture occurs. In order to supplement this, alloy elements such as chromium and molybdenum are added, or heat treatment is carried out to make cementite or pearlite in the structure spheroidal, to convert the matrix to sorbitic pearlite, or to convert a part of the sorbitic pearlite to martensite for increasing wear resistance and resistance to heat cracking. However these treatments are still insufficient.

Next in order to improve cast steel series rolls, adamite rolls having properties intermediate between cast steel and cast iron rolls with carbon content of 1.4%–2.4%, have been considered. Such a roll has fairly good wear resistance due to large amount of high hardness cementite in the structure compared with cast steel series rolls, however due to a smaller amount of cementite than is present in cast iron series rolls, its wear resistance is inevitably inferior to the cast iron series rolls. This roll has a structure in which one or two kinds of eutectic cementite and eutectoid cementite are precipitated in pearlite matrix in the as-cast condition. Since this structure is brittle, it is necessary to give toughness by cutting the network structure composed of eutectic and eutectoid cementite groups and by making spheroidal pearlite through a long period of heat treatment. However even by such heat treatment, eutectic cementite is very difficult to change from the shape of the as-cast condition, and therefore the roll is inevitably weaker than the cast steel series rolls. An adamite roll has superior toughness to the cast iron series rolls, therefore it is used when a large rolling load is required, heat cracking occurs easily due to thermal shocks, and wear due to spalling is not wanted.

Since in the case of a grain roll type of cast iron series rolls flake graphite is precipitated up to the roll surface, heat cracking due to thermal stress is small, but it has a defect of having a large wear and surface roughening. In a chilled roll, on the contrary, a large amount of hard cementite is precipitated at the barrel surface by rapid cooling and large amount of graphite is precipitated in the central part due to slow cooling to form grey iron structure, thus toughness is increased. Sometimes ductile cast iron is double poured at the central part of the roll to increase toughness of the roll. However due to the large amount of cementite precipitated in network structure at the roll surface, it is weak against thermal impact and readily gives rise to heat cracking, surface roughening and spalling.

Spheroidal graphite cast iron roll which has been widely used recently is a roll which has spheroidal graphite precipitated in the structure by adding magnesium or special elements having a similar effect. Toughness is increased by decreasing internal notch effect of graphite. In a speroidal graphite cast iron roll, hardness can be increased by free cementite in the structure, and also wear resistance can be increased. However since this cementite exhibits network or needle like structure, if the amount of cementite is increased, the property becomes brittle and resistance to heat cracking is also decreased.

A spheroidal graphite steel roll is a roll in which spheroidal graphite is precipitated in the as-cast condition by adding iron-calcium base alloy to high carbon steel of C 1.0%–1.5%. Therefore it is steel in nature but has also properties of cast iron, that is, since it has higher carbon content than the usual cast steel series rolls and has free graphite, it is said to be superior in wear resistance and resistance to heat cracking due to the thermal cushion effect of graphite. However in the spheroidal graphite roll, the network structure of eutectic cementite formed at the time of casting remains even after the heat treatment, and since the amount of cementite is small due to low carbon content, wear resistance is not sufficiently large.

The inventors have carried out fundamental studies on structures which would satisfy three major conditions required for a roll, namely, strong toughness, wear resistance and resistance to heat cracking simultaneously, and obtained the following results.

In order to give toughness to a roll, cementite or graphite in the structure should be distributed in fine grains, and there should be no cementite with network structure in the matrix. If the matrix itself is of tough quality, it shows almost the properties of steel. In order to give wear resistance to a roll, cementite which is harder than the matrix should be distributed uniformly in grains, and graphite should also be distributed in spheroidal form. Particularly, when large amount of cementite is distributed, wear of the roll is small during the rolling of steel. In resistance to heat cracking, if cementite grains or spheroidal graphite is distributed in matrix, thermal stress is absorbed, and the roll becomes strong for thermal impact. Moreover if the matrix is tough, thermal cracks formed become very fine. These are the findings of our studies.

Therefore from the above described observations on various roll structures, we concluded that the structure of the roll which satisfies the three major conditions required for a roll should have as large amount of fine cementite grains uniformly distributed as possible in tough matrix of high carbon content. In some cases, it can contain very small amount of fine graphite grains in the structure.

The inventors, after studying manufacturing method of a roll having such structure from the above point of view, discovered that the above described structure could be easily obtained if the cast iron having white cast iron structure at the time of casting was hot worked to a roll shape, and suitable heat treatment was carried out on it.

In other words, to give various superior mechanical and physical properties to a roll, we aim to obtain a cast iron roll having a microscopic structure of fine cementite grains uniformly distributed or in some cases a small amount of graphite precipitated in the structure by a special heat treatment carried out on the forged formation of cast iron, which is made by first choosing casting condition such that almost white pig iron structure is obtained at the time of casting, subsequently the cast block is plastically deformed at high temperature.

The cast iron rolls manufactured by the method of this invention are characterized by the following process: in the first step the cast iron roll contains 1.7%–3.8% carbon and below 2.5% silicon, and in order to make white pig iron like structure in as-cast condition, alloying elements are limited to the following amounts; manganese content below 1.0% chromium content below 2.0% molybdenum content below 2.0%, vanadium content below 1.0%, tungsten content below 1.0%. The minimum amount of one or more of these elements, is added. Further, in order to materially improve the quality of the casting, a nickel content below 5.0% and/or a cobalt content below 5.0% are used, and in order to get fine crystal grains in the as-cast condition contents of aluminium below 0.10%, titanium below 0.15%, zirconium below 0.30%, boron below 0.10%, beryllium below 0.20%, tellurium below 0.05% and/or the total of columbium and tantalum below 0.10% are used. The total content of detrimental elements such as phosphorus, sulphur, copper, tin, arsenic, lead, antimony, bismuth, and zinc is limited to below 0.20%, particularly below 0.15%. The method of manufacturing is characterized by combination of the following process steps: the step of making cast block of simple shape from a cast iron with the above special chemical composition, the cast block is plastically hot deformed to make a roll shape, the cast structure is destroyed, and carbide or graphite is made to be distributed in matrix as very fine structure, and heat treatment is carried out after hot working to give toughness to a material degree.

This invention was achieved by studies based on the inventions, "Hot Workable Cast Iron Alloy," the Japanese patent application No. 39/52890 and "Method of Manufacturing Cast Iron Roll," patent application No. 39/67436.

The reason why the chemical composition of the cast block produced by the method of this invention is limited in the prescribed range is the following: first the reason why carbon content is limited to 1.7% to 3.8% is as follows: as is generally known from iron-carbon equilibrium diagram, this range belongs to hypoeutectic pig iron, and for the total carbon content below 1.7%, the precipitation amount of cementite is too small to get sufficient hardness and wear resistance, and for above 3.8% hot workability of cast block becomes increasingly difficult and the mechanical properties of the roll become inferior. In the case of silicon, as the content increases, the strength of matrix is increased, and castability is improved, however when its content exceeds 2.5%, in the cast structure of the cast block, free graphite tends to be easily formed, and in order to make a structure like a white pig iron structure, large additions of alloying elements such as manganese and chromium for graphitization prevention are required. It also worsens greatly the hot workability of cast block and the mechanical strength after heat treatment. Therefore, silicon content should desirably be limited to the range of 0.4%–1.5%, and should not exceed 2.5%.

The alloying elements to be added to the cast block of this invention are manganese, chromium, molybdenum, vanadium and tungsten. These not only prevent the formation of free graphite in the as-cast condition, but also help to stabilize austenite and cementite at high temperature even during heating, hot working and heat treatment. However since the increase of these elements has a very harmful effect on high temperature deformability of the cast block of this invention, the maximum allowable contents are limited to manganese 1.0%, chromium 2.0% molybdenum 2.0%, vanadium 1.0% and tungsten 1.0%. Moreover the invention is characterized by the least amount addition of one or more of these elements such that the structure like white cast iron is obtained in as-cast condition based on iron-carbon binary carbide.

In the case of ordinary forged high carbon iron rolls, large amounts of alloying elements such as chromium, molybdenum, vanadium and tungsten are added to form compound carbides of iron-carbon with these elements, thereby improving hot workability of the roll.

On the contrary, in the case of cast iron rolls of this invention, by decreasing the contents of detrimental elements to extremely small amounts so as not to form the compound carbides, hot workability of the cast block is drastically improved by compensating for the iron-carbon binary carbide which worsens hot workability greatly and by making the matrix high purity. These are the essential points of difference between this invention and prior forged high carbon iron rolls.

When alloying elements like nickel and cobalt are added to the cast block, each of them stabilizes austenite at the hot working temperature of the cast body by making a solid solution with the austenite matrix of the structure, and improves hot workability of the cast block. Such elements have the effect of improving heat treatability and mechanical properties. However since both of these elements enhance graphitization in cast structure of the cast block, comparatively large amounts of graphitization prevention elements such as manganese and chromium should be added together with the above alloying elements.

If the addition of nickel and cobalt contents exceeds 5% respectively within the allowable range of each graphitization prevention element, a large amount of graphite is precipitated in the cast block, and the hot workability is worsened. Further if a suitable amount of alloying elements such as aluminium, titanium, zirconium, boron, beryllium, tellurium, columbium and tantalum (the latter two exist together, and show similar effect) is added to the cast iron composition, improvements of hot workability and mechanical properties are brought about since a fine primary structure is obtained. However if any of the limits (aluminium content 0.10%, titanium content 0.15%, zirconium content 0.30%, boron content 0.10%, beryllium content 0.20%, tellurium content 0.05%, and total of columbium and tantalum content 0.10%) is exceeded, the mechanical properties tend to become inferior. Therefore the allowable upper limits for the above alloying elements to the cast block are specified as above described.

In case large contents of 9 detrimental elements such as phosphorus, sulhpur, copper, tin, arsenic, lead, antimony, bismus and zinc exist in the cast block of this invention, chemical compounds such as sulphides and nitrides are formed, and complex compounds of these precipitate along the crystal boundaries as impurities and are harmful for high temperature deformability. Therefore the total of their contents should be limited to below 0.20% and particularly below 0.15% for the practice of this invention. Moreover when a detrimental element exists independently of the others, the maximum allowable limit for phosphorus is 0.030%, for sulphur below 0.015%, and particularly below 0.010% is desired, when phosphorus content exceeds 0.030%, ductility of the roll is decreased, and when sulphur content is increased, not only the high temperature deformability of cast block of this invention is badly affected but also anticracking property of the roll is badly affected. Moreover in order to avoid adverse effects on the hot workability of the cast block, anticracking property and toughness, arsenic content below 0.03% is desirable, and particularly when the total content of copper and tin exceeds 0.10%, hot deformability is very badly affected.

The first step of the manufacturing method of cast iron rolls relating to this invention is to cast the special cast iron composition into the cast block, the second step is to produce the desired form through hot working by forging after dispersion annealing and homogenization treatment as required, the third step is to heat treat this hot-worked casting to give necessary mechanical and physical properties for the intended use, and to machine form the roll.

In the first step of the invention, regardless of the shape and size of roll and sleeve, we can make cast block of simple shape such as cylindrical, polygonal, column or their hollow shapes. Moreover we can adopt any ordinary metal mould casting method, sand mould casting method or centrifugal casting method. Further we can produce one or more rolls or sleeves from one casting by the succeeding steps. Thus the first step is entirely different from the casting method generally carried out in which the required roll is cast in essentially its final configuration, and this is a major feature of this invention.

In other words, the fact that this invention changed fundamentally the usual concept of cast iron roll production is the important feature.

The heating temperature and hot working temperature of the second step of this invention should not exceed 1125° C. The hot working method of this invention is most suitably done by press forging. After heating up to 50° C. lower than the solidus line of the cast block of this invention, hot working in the temperature range of 1125° C.–900° C., particularly in higher temperature range, is desirably carried out. The cast block of this invention has two or three phases existing together, namely austenite and eutectic cementite or austenite, eutectic cementite and very small amount of graphite, but due to small contents of detrimental elements as previously described, plastic deformation is easy. Cementite which is said to be hard and brittle in general, and exists as a network in the as-cast condition, since the ductility of the matrix is large, can be dispersed uniformly in the matrix, being easily broken up into fine grains by the process of hot working. Further since cementite is arranged as a fiber-like structure in the shaft direction, the elasticity of the roll as a whole increases. Since the roll shaft part is shaped with a larger working ratio than the roll barrel part, the strength is also increased. Particularly in caliber rolls, the caliber part is not only hot formed but also can be made to have a fiber-like structure of uniform hardness distribtuion, and the inevitable defect of the usual cast iron roll in which hardness distribution was irregular at the caliber part is solved. Further by carrying out hot working according to this invention, the shape and arrangement of cementite are easily adjusted, and we can utilize effectively high hardness cementite distributed in grains. These features of the invention were very difficult to obtain in the usual cast iron rolls. Another feature of this invention is that various defects which are in as-cast condition, such as segregation and others, can be changed easily by hot working to a harmless condition.

The third step in the invention is the heat treating of the cast iron work piece and machining. By this step, the mechanical properties required in roll applications are given to the roll. The hot-worked casting is slow cooled in a furnace or in sand to prevent crackings due to stress retained in hot working of the cast block. The forged body is annealed by keeping in the temperature range of 750° C.–850° C., which is above AC1 transformation point, and machined after the material is softened. Thus the cast block is made to form almost the roll shape or sleeve shape. In the above heat treating process, sometimes the hot-worked casting is directly annealed in the temperature range of 750° C.–850° C. after hot working, omitting the slow cooling process. The microscopic structure of hot-worked casting after annealing shows a small amount of fine graphite grains and finely dispersed eutectic cementite in the ferrite matrix. The material is soft, therefore in order to give various mechanical properties required for the roll material, further heat treatment process must be carried out.

That is, the hot-worked casting is quenched or normalized after keeping the body in the temperature range of 850° C.–950° C., and ausenite in the matrix is transformed into martensite, then tempered in the temperature range of 400° C.–700° C. depending on chemical composition, the shape of the hot-worked casting, and the surface hardness required. By this tempering operation, the matrix is changed into sorbite or sorbitic pearlite, and ductility is given to the roll.

The transformation stress and thermal stress arising in the above quenching and normalizing operation can be mostly removed by the tempering operation, however, in order to remove the residual stress completely, low temperature tempering in the temperature range of 150° C.–250° C. is carried out. Then the hot-worked casting is machine finished, and the cast iron roll or sleeve is completed.

These series of heat treating conditions were obtained from many experimental results of the inventors. The microscopic structure of the cast iron roll thus obtained shows cementite grains dispersed in a matrix of sorbite having high ductility or in matrix of sorbitic pearlite, and in some cases fine particles of free graphite are contained in the matrix. This structure has never been observed in the usual cast iron rolls.

The above first, second, and third steps are based on the cast iron with special chemical composition of the first step, and are necessary for the production of the cast iron roll of this invention. Therefore the second step becomes effective only when it is adjusted in relation to the first step, and the third step in relation to the second. The combination of steps should be adjusted in accordance with the shape and application of the cast iron roll to be manufactured.

Next we will explain briefly the figures which show the test results of several examples carried out to determine chemical compositions and heat treatment conditions concerning the cast iron roll of this invention, and subsequently will explain the detail of the experiments.

Figure 4:
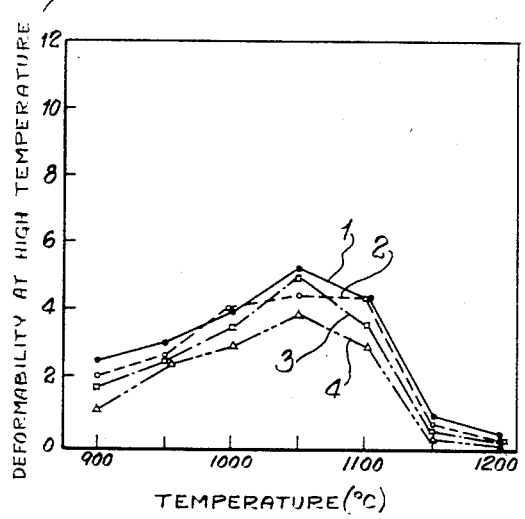
Figure 4:
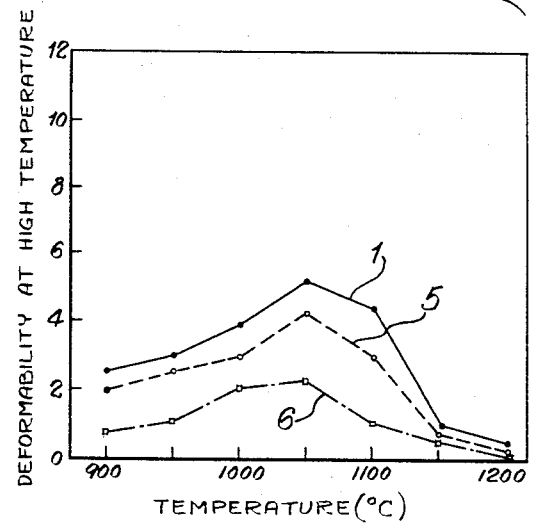
Figure 4:
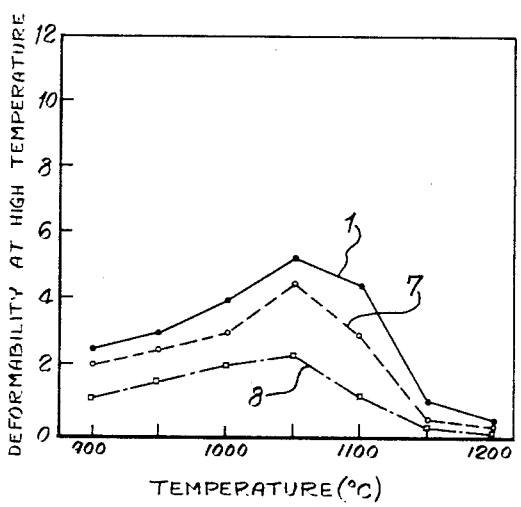
Figure 4:
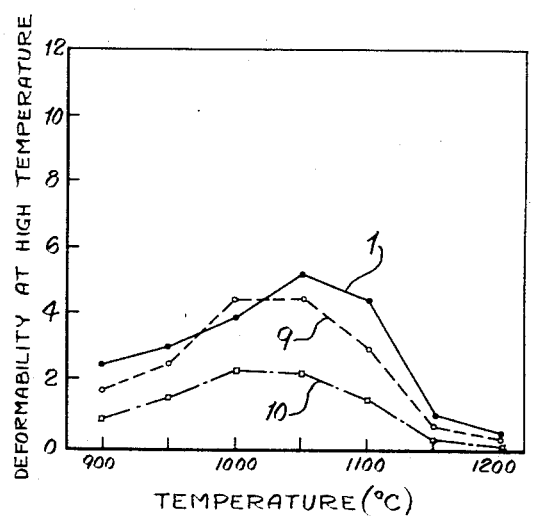

FIG. 4 shows relations between the total amount of detrimental elements of the cast iron roll of this invention and temperature variations of high temperature deformability; the temperatures of the test are expressed in abscissa in all of FIGS. 4(a), (b), (c) and (d), and the torsion fracture numbers showing high temperature deformability are expressed in ordinate. The numbers designating each curve in the figure show the test piece numbers in Table 1. (a) of the figure shows the test result for phosphorus containing case, (b) sulphur containing case, (c) arsenic containing case, and (d) for copper and tin simultaneous containing case respectively.

Figure 5:
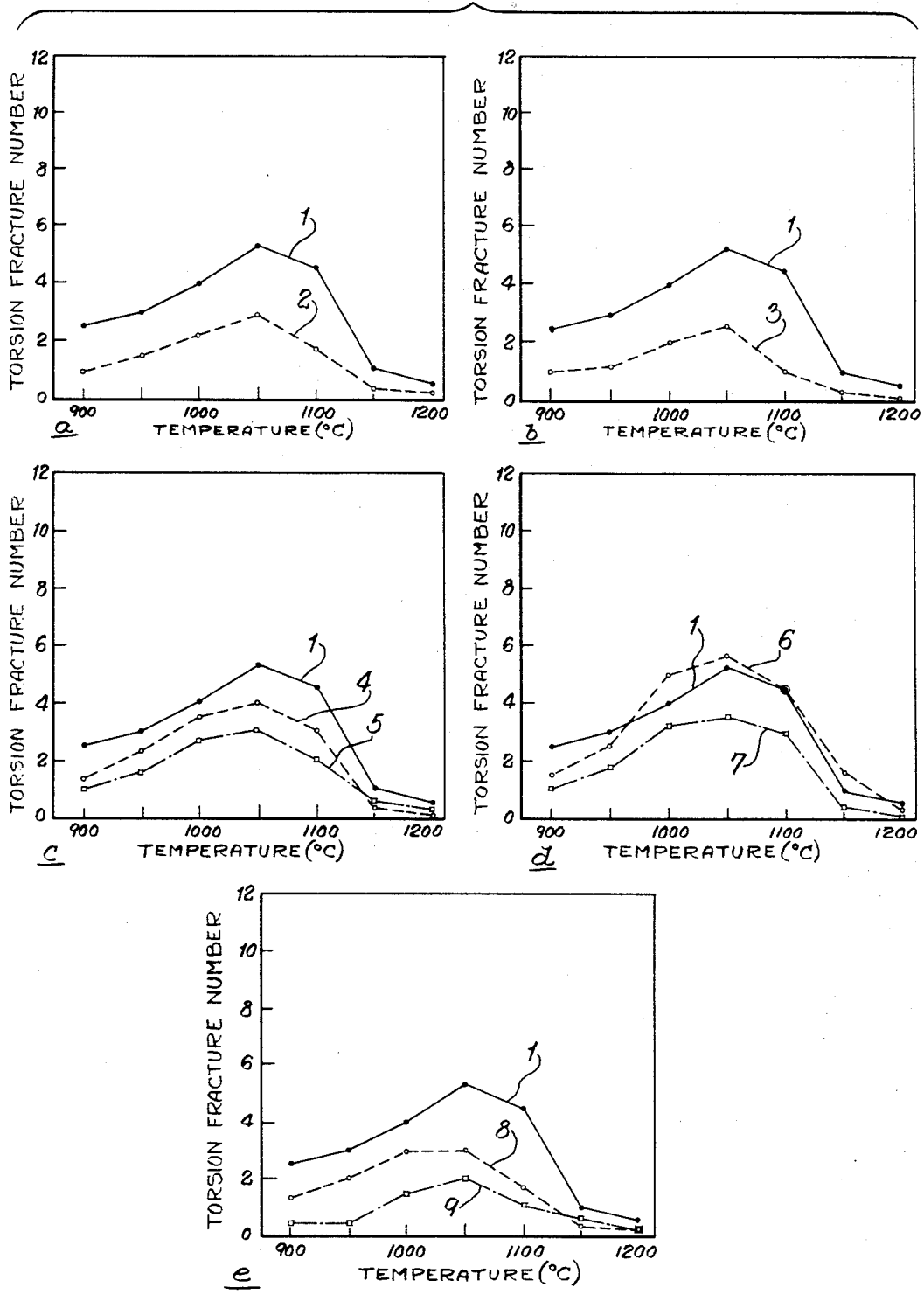

FIG. 5 shows relations between contents of alloying elements (manganese, chromium, molybdenum, vanadium and tungsten) of the cast iron roll of this invention and temperature variations of the high temperature deformability; the temperatures of the test are expressed in abscissa in all (a), (b), (c), (d) and (e) of the figure, and the torsion fracture numbers showing high temperature deformability are expressed in ordinate. The numbers designating each curve in the figure show the test piece numbers of Table 3. (a) of the figure shows the test result for the case of manganese content, (b) for chromium content (c) for molybdenum content, (d) for vanadium content and (e) for tungsten content respectively.

FIG. 6 shows relations between contents of alloying elements (nickel and cobalt) of the cast iron roll of this invention and high temperature deformability; the temperatures of the test are shown in abscissa in (a) and (b) of the the figure, and the torsion fracture numbers showing high temperature deformability are expressed in ordinate. The numbers on the curves in the figure show the test piece numbers of Table 5. (a) of the figure shows the test result for the nickel containing case, and (b) for the cobalt containing case respectively.

FIG. 7 shows cross-section hardness distribution of the cast iron roll manufactured by the method of this invention; the distance from the roll surface is expressed in abscissa, and hardness is expressed in ordinate. A, B, and C in the figure show the test piece numbers of Table 7.

Figure 8:
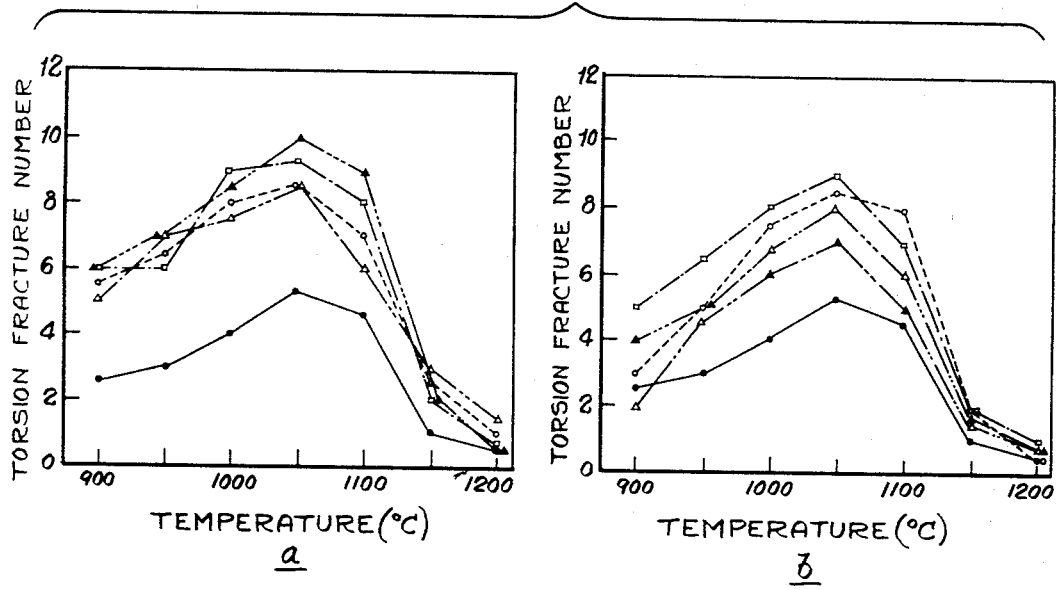

FIG. 8 shows temperature variations of high temperature deformability for additions of alloying elements (aluminium, titanium, zirconium, boron, beryllium, tellurium, columbium and tantalum) to the cast iron roll of this invention respectively; the temperatures of the test are expressed in abscissa for (a) and (b) of the figure, and the torsion fracture numbers expressing high temperature deformability are shown in ordinate. The numbers attached to the curves in the figure show the test piece numbers of Table 8. (a) of the figure shows the test result for aluminium, titanium, and zirconium containing case, (b) for boron, beryllium, tellurium, columbium and tantalum containing rolls respectively.

Figure 9A:
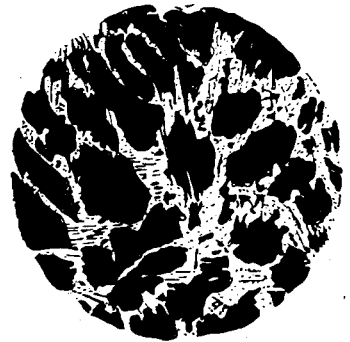
Figure 9B:

FIG. 9 shows an example of microscopic structure of the cast iron roll manufactured by the method of this invention. (a) of the figure shows the microscopic structure of as-cast condition for the case in which aluminium and titanium are not added, (b) shows the same for the case in which aluminium is added as an alloying element respectively.

FIG. 10 shows temperature variations of high temperature deformability when alloying elements of two groups such as nickel and cobalt, and aluminium, titanium, zirconium, boron, beryllium, tellurium and columbium together with tantalum are simultaneously added to the cast iron roll of this invention; the temperatures of the test in each (a), (b) (c) of the figure are shown in abscissa, and torsion fracture numbers showing high temperature deformability are expressed in ordinate. The numbers attached to the curves in the figure show the test piece numbers of Table 11. (a) of the figure shows the test result for the case of simultaneous additions of nickel and cobalt, and aluminium and titanium, (b) for the case of simultaneous additions of nickel and cobalt, and zirconium and boron, (c) for the case of simultaneous additions of nickel and cobalt, and beryllium, tellurium and columbium together with tantalum respectively.

FIG. 11 shows an example of microscopic structure of the cast iron roll of this invention in which nickel and cobalt are added. (a) of the figure shows microscopic structure of as-cast condition, (b) shows that of after hot working and heat treatment.

Figure 12:
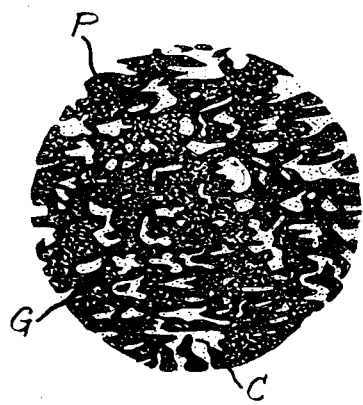

FIG. 12 shows an example of microscopic structure for the cast iron roll of this invention in which aluminium and titanium are added.

FIG. 13 shows an example of microscopic structure for the cast iron roll of this invention in which nickel and cobalt, and aluminium and titanium are simultaneously added; (a) of the figure shows the microscopic structure of as-cast condition, and (b) shows that obtained after hot working and heat treatment.

TEST EXAMPLE 1

Figure 1:
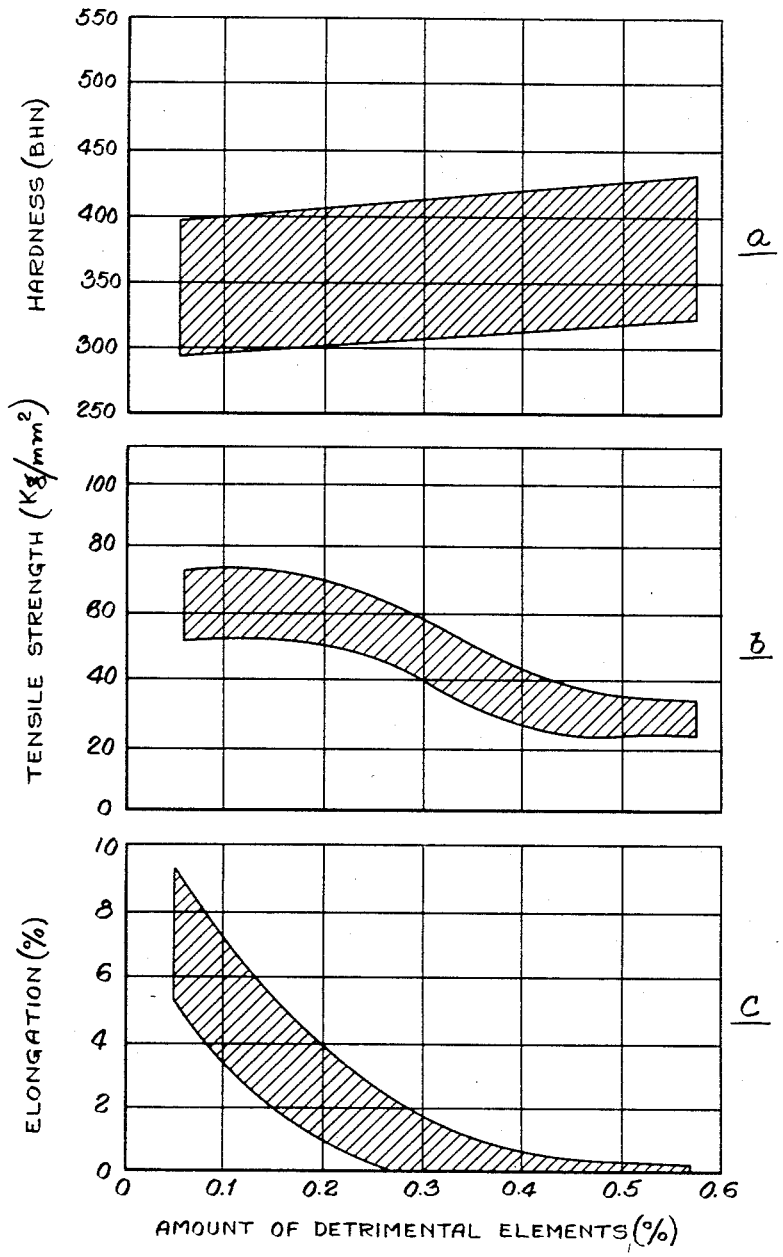
FIG. 1 shows relations between the total amount of detrimental elements in the cast iron roll of this invention and the mechanical properties; in abscissa the total amount of detrimental element is shown in all cases, and inordinate hardness (a), tensile strength (b) and elongation (c) are shown.
Figure 2:
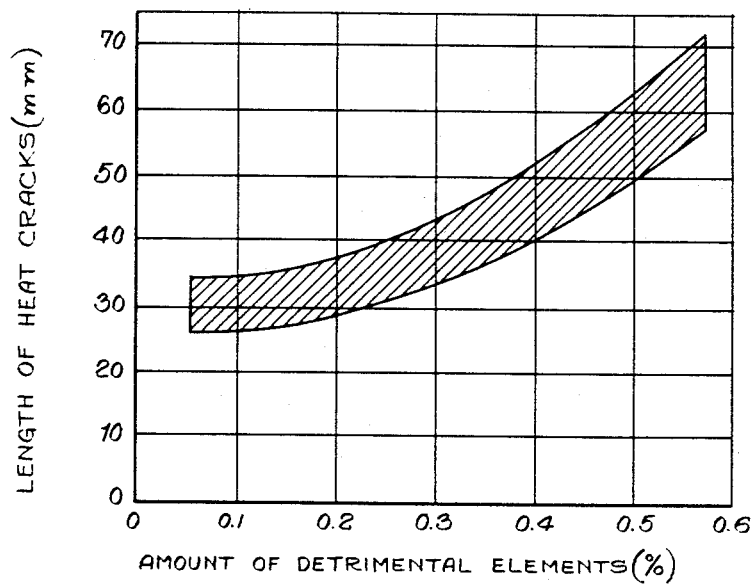
FIG. 2 shows a relation between the total amount of detrimental elements of the cast iron roll of this invention and lengths of heat cracks formed; the total amount of the detrimental elements is expressed in abscissa, and the length of heat cracks formed is expressed in ordinate.
Figure 3:
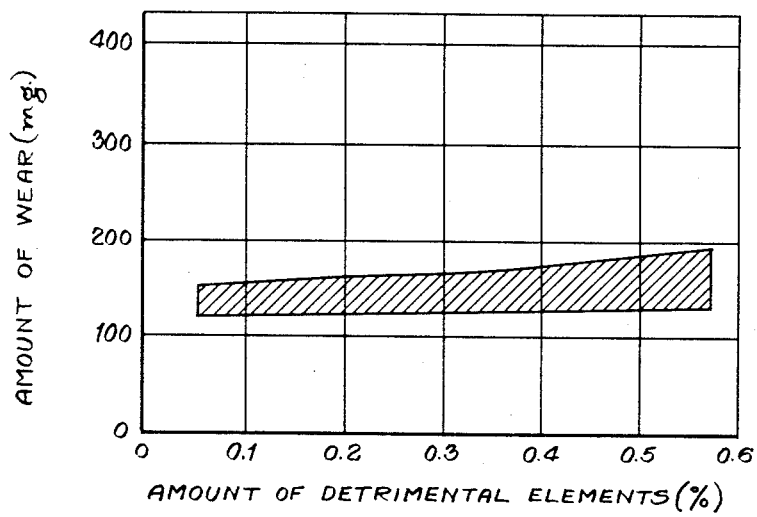
FIG. 3 shows a relation between the total amount of detrimental elements of the cast iron roll of this invention and wear amount; and the total amount of detrimental elements is expressed in abscissa, and the amount of wear is expressed in ordinate.

This experiment was carried out to obtain relation between the total amount of detrimental elements and mechanical and physical properties. In FIG. 1, FIG. 2 and FIG. 3, results of many experiments carried out under the following same conditions to obtain the relations between the total amount of the 9 detrimental elements: phosphorus, sulphur, copper, tin, arsenic, lead, antimony, bismus and zinc. Mechanical as well as physical properties are shown. We chose, as the fundamental chemical composition of the test piece carbon content 3.0%–3.1%, silicon content 0.55%–0.58%, manganese content 0.56%–0.57%, chromium content 1.0%–1.10%, and molybdenum content 0.37%–0.39%. The total amount of detrimental elements was varied by adding arbitrary amounts of detrimental elements from 0.06% to 0.57% to them. The results are shown in FIGS. 1, 2, and 3.

One hundred kg. batches of the test material were melted in a high frequency furnace, and the cast iron formation was obtained through casting, forging, and heat treatment processes based on the method of this invention. The forging ratio was 4.1 S. (This is the notation defined by the Japan Industrial Standards (JIS), where S represents the solid forging, and the number shows the ratio $(A/a)$ between the cross-section area A of the cast body before forging and cross-section area $a$ after forging.)

The test material was air cooled after keeping at 900° C. for 40 minutes after slow cooling the forged formation, then air cooled after keeping at 630° C. for 60 minutes. FIG. 1 shows the relations between the amounts of detrimental elements and mechanical properties such as (a) hardness (BHN), (b) tensile strength (kg./mm.²) and (c) elongation (percent), FIG. 2 shows the relation between the amounts of detrimental elements and lengths of heat cracks formed, and FIG. 3 shows the relations between the amounts of detrimental elements and wear amounts in the wear experiments.

As can be seen from these figures, when the total amount of detrimental elements exceed 0.15%, and particularly 0.20%, the mechanical properties and resistance to heat cracking of the forged formation of cast iron are found to become very bad.

Therefore as a necessary condition for giving superior properties to the cast iron roll relating to the invention, it became clear that the total content of the prescribed detrimental elements is desirably kept below 0.20%, and particularly below 0.15%.

TEST EXAMPLE 2

This experiment was carried out in order to obtain the relation between the contents of detrimental elements and hot deformability. Specifically, in this experiment, the relation between hot deformability and the contents, as single elements, of phosphorus, sulphur, arsenic, copper and tin, which are most generally contained in cast iron rolls as detrimental elements. The results are shown in FIG. 4. In the figure (a) shows the case of phosphorus content as variable, (b) sulphur content, (c) arsenic content, (d) total of copper and tin contents respectively. The figure shows temperature variation of hot deformabilities for each case. The chemical composition of these test samples are shown in Table 1.

TABLE 1.—CHEMICAL COMPOSITION, PERCENT

| Sample No. | C | Si | Mn | Cr | Mo | P | S | Cu | Sn | As | Pb | Sb | Bi | Zn |
|---|---|---|---|---|---|---|---|---|---|---|---|---|---|---|
| 1 | 3.15 | 0.63 | 0.82 | 1.12 | 0.36 | 0.009 | 0.008 | 0.018 | 0.009 | 0.003 | All traces. | | | |
| 2 | 3.08 | 0.58 | 0.81 | 1.18 | 0.34 | 0.023 | 0.010 | 0.017 | 0.008 | 0.008 | All traces. | | | |
| 3 | 3.08 | 0.66 | 0.75 | 1.16 | 0.37 | 0.035 | 0.011 | 0.018 | 0.009 | 0.009 | All traces. | | | |
| 4 | 3.19 | 0.72 | 0.77 | 1.08 | 0.37 | 0.052 | 0.009 | 0.021 | 0.010 | 0.009 | All traces. | | | |
| 5 | 3.22 | 0.65 | 0.78 | 1.07 | 0.39 | 0.010 | 0.013 | 0.020 | 0.011 | 0.010 | All traces. | | | |
| 6 | 3.14 | 0.58 | 0.71 | 1.12 | 0.37 | 0.012 | 0.038 | 0.022 | 0.010 | 0.009 | All traces. | | | |
| 7 | 3.05 | 0.62 | 0.79 | 1.19 | 0.42 | 0.011 | 0.008 | 0.021 | 0.011 | 0.016 | All traces. | | | |
| 8 | 3.17 | 0.65 | 0.73 | 1.10 | 0.39 | 0.011 | 0.009 | 0.019 | 0.010 | 0.038 | All traces. | | | |
| 9 | 3.16 | 0.59 | 0.74 | 1.12 | 0.34 | 0.015 | 0.012 | 0.065 | 0.023 | 0.011 | All traces. | | | |
| 10 | 3.21 | 0.63 | 0.75 | 1.08 | 0.33 | 0.013 | 0.011 | 0.118 | 0.065 | 0.010 | All traces. | | | |

Contents of lead, antimony, bismus and zinc are shown as tr. This means that these contents can not be detected by ordinary quantitative chemical analysis. Such contents are considered to be a small trace. Hot deformability in this experiment is expressed by number of torsions before fracture in a high temperature torsion test.

As can be seen from FIG. 4, phosphorus content does not give marked effect on hot deformability, but sulfur, arsenic, and the total of copper and tin give marked detrimental effects on hot deformability as their contents are increased. Further we studied the effect of phosphorus content on mechanical properties of the cast body. The heat treatment based on the Test Example 1, was carried out on above test samples of No. 1–No. 4. The results are shown in Table 2.

TABLE 2.—MECHANICAL PROPERTIES

| Test sample No. | Hardness, BHN | Tensile strength, kg./mm.$^2$ | Elongation, percent |
|---|---|---|---|
| 1 | 331 | 72.1 | 3.8 |
| 2 | 331 | 71.8 | 3.4 |
| 3 | 352 | 73.4 | 2.8 |
| 4 | 363 | 75.1 | 1.5 |

As can be seen from the table, mechanical properties become bad as phosphorus content is increased.

TEST EXAMPLE 3

This experiment was carried out to obtain relation between mechanical properties as well as hot deformability and amounts of alloying elements such as manganese, chromium, molybdenum, vanadium and tungsten.

The preparation of the test material was similar to the Test Example 1, and the chemical compositions of test samples are shown in Table 3.

TABLE 3.—CHEMICAL COMPOSITION, PERCENT

| Sample No. | C | Si | Mn | Cr | Mo | V | W |
|---|---|---|---|---|---|---|---|
| 1 | 3.15 | 0.63 | 0.81 | 1.12 | 0.36 | 0.007 | |
| 2 | 3.21 | 0.68 | 1.25 | 1.03 | 0.42 | 0.008 | |
| 3 | 3.18 | 0.72 | 0.73 | 2.15 | 0.35 | 0.010 | |
| 4 | 3.22 | 0.58 | 0.78 | 1.20 | 1.58 | 0.009 | |
| 5 | 3.15 | 0.69 | 0.84 | 1.09 | 1.88 | 0.007 | |
| 6 | 3.31 | 0.56 | 0.82 | 1.18 | 0.38 | 0.48 | |
| 7 | 3.09 | 0.68 | 0.88 | 1.14 | 0.45 | 0.97 | |
| 8 | 3.19 | 0.59 | 0.80 | 1.08 | 0.20 | 0.008 | 0.58 |
| 9 | 3.07 | 0.68 | 0.91 | 1.15 | 0.01 | 0.010 | 1.02 |

The relations between mechanical properties and amounts of alloying elements are shown in Table 4.

TABLE 4.—MECHANICAL PROPERTIES

| Test sample No. | Hardness, BHN | Tensile strength, kg./mm.$^2$ | Elongation, percent |
|---|---|---|---|
| 1 | 331 | 72.1 | 3.8 |
| 2 | 363 | 75.3 | 3.2 |
| 3 | 429 | 81.6 | 2.3 |
| 4 | 429 | 83.6 | 2.3 |
| 5 | 444 | 87.8 | 1.7 |
| 6 | 401 | 80.3 | 3.9 |
| 7 | 429 | 83.8 | 2.8 |
| 8 | 444 | 85.4 | 2.9 |
| 9 | 461 | 88.5 | 0.2 |

The relation between hot deformability and amounts of alloying elements are shown in FIG. 5. In this figure (a) shows the case of manganese content as variable; (b), chromium content; (c), molybdenum content; (d), vanadium content; and (e) tungsten content. The hot deformability for each case is shown to be dependent on temperature. As can be seen from Table 3, Table 4 and FIG. 5, when manganese content of 1.0%, chromium content of 2.0%, molybdenum content of 2.0%, vanadium content of 1.0%, and tungsten content of 1.0% are exceeded, mechanical properties and hot deformability are detrimentally affected.

TEST EXAMPLE 4

This experiment was carried out to obtain the relations between content of alloying elements like nickel and cobalt and mechanical properties as well as hot deformability.

The preparation of the test pieces was similar to the Example 1, and their chemical compositions are shown in Table 5.

TABLE 5.—CHEMICAL COMPOSITION, PERCENT

| Sample No. | C | Si | Mn | Cr | Mo | Ni | Co |
|---|---|---|---|---|---|---|---|
| 1 | 3.15 | 0.63 | 0.82 | 1.12 | 0.36 | 0.03 | |
| 2 | 3.22 | 0.61 | 0.75 | 1.02 | 0.35 | 0.30 | |
| 3 | 3.11 | 0.59 | 0.72 | 1.35 | 0.43 | 1.50 | 0.03 |
| 4 | 3.10 | 0.53 | 0.76 | 1.63 | 0.35 | 2.70 | 0.08 |
| 5 | 3.08 | 0.47 | 0.73 | 1.75 | 0.33 | 3.60 | 0.10 |
| 6 | 3.18 | 0.41 | 0.79 | 1.93 | 0.38 | 4.80 | 0.13 |
| 7 | 3.09 | 0.42 | 0.70 | 1.56 | 0.36 | 0.06 | 2.30 |
| 8 | 3.14 | 0.41 | 0.77 | 1.88 | 0.39 | 0.05 | 4.50 |
| 9 | 3.15 | 0.62 | 0.72 | 1.95 | 0.35 | 2.50 | 2.32 |

The relationship between these alloying elements and mechanical properties are shown in Table 6, and the relationship between these elements and hot deformability are shown in FIG. 6. In FIG. 6 temperature variation of hot deformability is shown for (a) nickel content as variable, and (b) cobalt content as variable respectively.

TABLE 6.—MECHANICAL PROPERTIES

| Test sample No. | Hardness, BHN | Tensile strength, kg./mm.$^2$ | Elongation, percent |
|---|---|---|---|
| 1 | 331 | 72.1 | 3.8 |
| 2 | 341 | 73.0 | 4.6 |
| 3 | 388 | 75.2 | 4.5 |
| 4 | 401 | 81.9 | 3.7 |
| 5 | 415 | 83.6 | 3.6 |
| 6 | 444 | 85.2 | 3.2 |
| 7 | 401 | 81.5 | 3.8 |
| 8 | 461 | 84.3 | 3.4 |
| 9 | 461 | 84.0 | 3.4 |

As can be seen from Table 5, Table 6 and FIG. 6, mechanical properties and hot deformability are improved when nickel and cobalt are added as alloying elements. However when nickel addition of 5.0% and cobalt content of 5.0% are exceeded, mechanical properties and hot deformability are badly affected.

TEST EXAMPLE 5

This experiment was carried out to obtain the relationship between the nickel and cobalt contents of cast iron roll manufactured by the method of this invention and cross-section hardness distribution.

The test samples were rolls with a barrel diameter of about 400 mm. which were hot worked (forging ratio 4.1 S), and then normalized by keeping them at 900° C. for 8 hours, and tempered by keeping them at 650° C. for one hour. Their chemical compositions are shown in Table 7, and their cross-sectional hardness distributions are shown in FIG. 7.

TABLE 7.—CHEMICAL COMPOSITIONS

| Sample No.: | C | Si | Mn | Cr | Mo | Ni | Co |
|---|---|---|---|---|---|---|---|
| A | 3.20 | 0.55 | 0.77 | 1.02 | 0.35 | 0.04 | |
| B | 3.19 | 0.00 | 0.80 | 1.05 | 0.37 | 1.16 | 0.25 |
| C | 3.25 | 0.58 | 0.79 | 1.95 | 0.39 | 3.71 | 0.50 |

As can be seen from Table 7 and FIG. 7, as nickel and cobalt contents in the cast iron roll are increased, the hardness decrease from the roll surface becomes small; and nickel and cobalt improve the heat treatment effect of the cast iron roll as formed.

TEST EXAMPLE 6

This experiment was carried out to compare the mechanical properties and hot workabilities between alloying elements such as aluminium, titanium, zirconium, boron, beryllium, tellurium and columbium together with tantalum are added to the cast iron and the ones to which no alloying element is added.

The preparation of the test samples is similar to the Test Example 1, and chemical compositions of these samples are shown in Table 8.

TABLE 8.—CHEMICAL COMPOSITIONS, PERCENT

| Sample No.: | C | Si | Mn | Cr | Mo | Al | Ti | Zr | B | Be | Te | Cb+Ta |
|---|---|---|---|---|---|---|---|---|---|---|---|---|
| 1 | 3.15 | 0.63 | 0.82 | 1.12 | 0.30 | 0.010 | 0.006 | | | | | |
| 2 | 3.19 | 0.58 | 0.77 | 1.12 | 0.33 | 0.033 | 0.006 | | | | | |
| 3 | 3.21 | 0.57 | 0.81 | 1.08 | 0.36 | 0.011 | 0.060 | | | | | |
| 4 | 3.20 | 0.57 | 0.82 | 1.07 | 0.32 | 0.010 | 0.005 | 0.183 | | | | |
| 5 | 3.16 | 0.60 | 0.79 | 1.10 | 0.37 | 0.015 | 0.005 | | 0.065 | | | |
| 6 | 3.22 | 0.59 | 0.85 | 1.10 | 0.36 | 0.012 | 0.006 | | | 0.121 | | |
| 7 | 3.09 | 0.60 | 0.79 | 1.20 | 0.38 | 0.011 | 0.007 | | | | 0.030 | |
| 8 | 3.12 | 0.57 | 0.80 | 1.13 | 0.35 | 0.013 | 0.006 | | | | | 0.018 |
| 9 | 3.27 | 0.56 | 0.83 | 1.15 | 0.39 | 0.028 | 0.053 | | | | | |

The variations of mechanical properties due to additions of these alloying elements are shown in Table 9, and variations of hot workabilities are shown in FIG. 8. (a) of FIG. 8 shows a comparison of temperature dependence of hot workabilities for no alloy addition, alloy addition of aluminium, zirconium and titanium separately, and simultaneous addition of aluminium and titanium. (b) shows the comparison of temperature dependences of hot workabilities for no alloy addition and alloy addition of boron, beryllium, tellurium and columbium together with tantalum separately.

TABLE 9.—MECHANICAL PROPERTIES

| Test sample No.: | Hardness, BHN | Tensile strength, kg./mm.$^2$ | Elongation, percent |
|---|---|---|---|
| 1 | 331 | 72.1 | 3.8 |
| 2 | 341 | 74.2 | 4.6 |
| 3 | 352 | 76.4 | 5.1 |
| 4 | 352 | 76.3 | 5.3 |
| 5 | 331 | 74.8 | 5.0 |
| 6 | 331 | 74.8 | 4.6 |
| 7 | 321 | 74.0 | 4.9 |
| 8 | 341 | 75.5 | 4.5 |
| 9 | 352 | 77.0 | 5.6 |

As can be seen from Table 8, Table 9 and FIG. 8, when aluminium, titanium, zirconium, boron, beryllium, tellurium, columbium and tantalum are added as alloying elements, the mechanical properties and hot workabilities are greatly improved.

TEST EXAMPLE 7

Miscroscopic structures for a test sample taken from the cast iron roll of this invention in the as-cast condition containing aluminium and titanium and for the sample without these alloying elements are compared.

In Table 10, their chemical compositions are given.

TABLE 10.—CHEMICAL COMPOSITIONS, PERCENT

| Test sample No.: | C | Si | Mn | Cr | Mo | Al | Ti |
|---|---|---|---|---|---|---|---|
| A | 2.82 | 0.70 | 0.75 | 1.10 | 0.39 | 0.011 | 0.005 |
| B | 2.76 | 0.62 | 0.68 | 1.17 | 0.34 | 0.020 | 0.043 |

FIG. 9(a) shows microscopic structure of sample A (magnification 100), and (b) shows microscopic structure of sample B (magnification 100). In each case cementite network is precipitated in pearlite matrix. We find that the B sample to which aluminium and titanium are added shows smaller primary crystals than those in the sample A without addition.

TEST EXAMPLE 8

This experiment was carried out to ascertain the change in mechanical properties and hot workabilities of the cast iron containing alloying elements of nickel and cobalt to which aluminium, titanium, zirconium, boron, beryllium, tellurium and columbium together with tantalum are simultaneously added.

The preparation of test materials is similar to the Test Example 1, and the chemical compositions of these samples are shown in Table 11.

TABLE 11.—CHEMICAL COMPOSITIONS, PERCENT

| Test sample No.: | C | Si | Mn | Cr | Mo | Ni | Co | Al | Ti | Zr | B | Be | Te | Cb+Ta |
|---|---|---|---|---|---|---|---|---|---|---|---|---|---|---|
| 1 | 3.15 | 0.63 | 0.82 | 1.12 | 0.36 | 0.03 | | 0.010 | 0.006 | | | | | |
| 2 | 3.10 | 0.53 | 0.76 | 1.63 | 0.35 | 2.70 | 0.08 | 0.011 | 0.006 | | | | | |
| 3 | 3.22 | 0.54 | 0.77 | 1.65 | 0.32 | 2.64 | 0.08 | 0.028 | 0.007 | | | | | |
| 4 | 3.16 | 0.57 | 0.85 | 1.68 | 0.34 | 2.71 | 0.09 | 0.011 | 0.057 | | | | | |
| 5 | 3.21 | 0.58 | 0.81 | 1.63 | 0.35 | 2.62 | 0.08 | 0.012 | 0.005 | 0.191 | | | | |
| 6 | 3.16 | 0.60 | 0.83 | 1.66 | 0.35 | 2.73 | 0.09 | 0.011 | 0.005 | | 0.074 | | | |
| 7 | 3.23 | 0.58 | 0.80 | 1.72 | 0.28 | 2.70 | 0.07 | 0.013 | 0.005 | | | 0.121 | | |
| 8 | 3.19 | 0.57 | 0.80 | 1.68 | 0.34 | 2.66 | 0.07 | 0.015 | 0.006 | | | | 0.030 | |
| 9 | 3.17 | 0.65 | 0.79 | 1.77 | 0.38 | 2.68 | 0.07 | 0.012 | 0.007 | | | | | 0.165 |
| 10 | 3.23 | 0.62 | 0.80 | 1.65 | 0.38 | 2.74 | 0.09 | 0.021 | 0.055 | | | | | |

Changes in the mechanical properties due to addition of these alloying elements are shown in Table 12, and changes in the hot workabilities are shown in FIG. 10. (a) of FIG. 10 shows comparative temperature variations of hot workabilities for the sample without alloy addition, the sample with addition of nickel and cobalt only and the sample with addition of aluminium and titanium in addition to nickel and cobalt, (b) for the simultaneous additions of zirconium and boron, and (c) for the simultaneous additions of beryllium, tellurium and columbium together with tantalum respectively.

TABLE 12.—MECHANICAL PROPERTIES

| | Hardness, BHN | Tensile strength, kg./mm.$^2$ | Elongation, percent |
|---|---|---|---|
| Test sample No.: | | | |
| 1 | 331 | 72.1 | 3.8 |
| 2 | 401 | 81.9 | 3.7 |
| 3 | 401 | 81.9 | 3.9 |
| 4 | 415 | 82.2 | 3.6 |
| 5 | 401 | 82.1 | 3.5 |
| 6 | 375 | 80.2 | 4.4 |
| 7 | 375 | 80.6 | 4.0 |
| 8 | 388 | 80.6 | 4.5 |
| 9 | 388 | 80.3 | 4.5 |
| 10 | 415 | 82.5 | 4.0 |

As can be seen from Table 11, Table 12, and FIG. 10, by simultaneous addition of alloying elements, aluminium, titanium, zirconium, boron, beryllium, tellurium, columbium and tantalum to nickel and cobalt-containing materials, the mechanical properties and hot deformabilities are improved.

TEST EXAMPLE 9

The following tests were carried out to obtain changes of mechanical properties by the heat treatment method on samples taken from the cast iron roll manufactured by the method of this invention.

(1) Chemical compositions (percent) of the samples:

TABLE 13

| Test sample No. | C | Si | Mn | Cr | Mo | V | Ni | Co | Al | Ti | P | S | Cu | As | Sn | Pb | Sb | Bi | Zn |
|---|---|---|---|---|---|---|---|---|---|---|---|---|---|---|---|---|---|---|---|
| 1 | 3.00 | 0.51 | 0.61 | 1.78 | 0.29 | 0.009 | 3.94 | 0.11 | 0.015 | 0.005 | 0.009 | 0.008 | 0.010 | 0.008 | 0.008 | (¹) | (¹) | (¹) | (¹) |
| 2 | 2.76 | 0.62 | 0.68 | 1.17 | 0.34 | 0.008 | 0.02 | | 0.020 | 0.043 | 0.012 | 0.008 | 0.021 | 0.010 | 0.009 | (¹) | (¹) | (¹) | (¹) |
| 3 | 3.05 | 0.68 | 0.79 | 1.15 | 0.45 | 0.10 | 0.75 | 0.02 | 0.043 | 0.035 | 0.009 | 0.008 | 0.021 | 0.009 | 0.007 | (¹) | (¹) | (¹) | (¹) |

¹ Traces.

(2) Size of the samples:

TABLE 14

| | Diameter | Length | Forging ratio |
|---|---|---|---|
| Test sample No.: | | | |
| 1 | 25 mm.φ | 200 mm | 2.8 S |
| 2 | 25 mm.φ | 200 mm | 3.6 S |
| 3 | 25 mm.φ | 200 mm | 4.5 S |

Figure 11A:
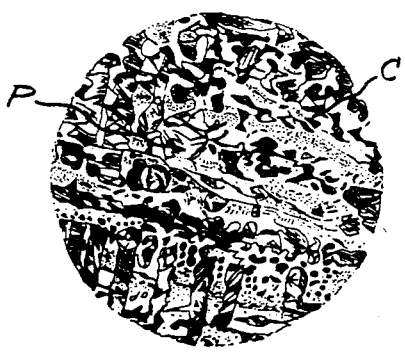
Figure 11B:
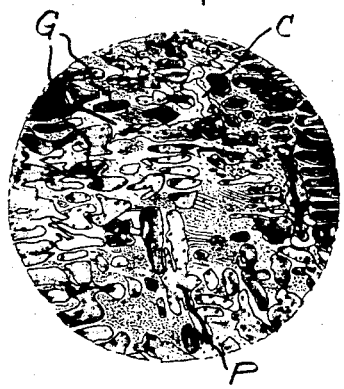
Figure 13A:
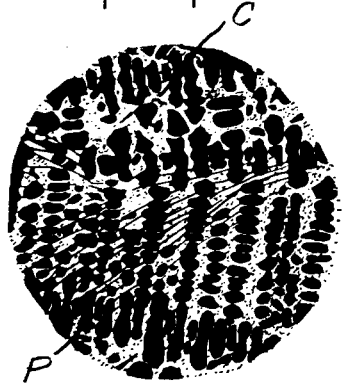
Figure 13B:
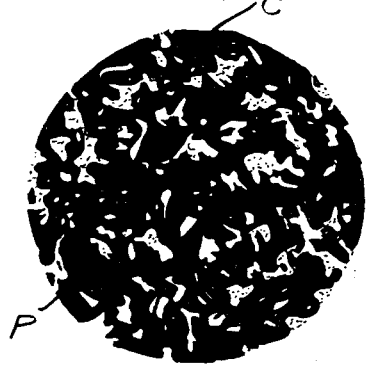

(3) Mechanical properties and microscopic structures after heat treatment:

condition, (b) shows microscopic structure of the cast iron roll which was given heat treatment of B in the Table 15. FIG. 12 shows an example of microscopic structure of the Test Sample No. 2 (the sample taken from the cast iron roll to which aluminium and titanium are added), which was given heat treatment of B in the Table 15. FIG. 13 shows an example of microscopic structure of the Test Sample No. 3 (the sample taken from the cast iron roll to which nickel, cobalt, aluminium and titanium are simultaneously added), and (a) of the figure shows the structure of as-cast condition (b) the microscopic structure of the sample to which heat treatment of B in the Table 15 is given. FIG. 11(a) and FIG. 13(a) show the dendritic structure formed at the time of casting, and show also that cementite (C) and the network structure of pearlite (P) are destroyed by hot working. In FIG. 11(b), FIG. 12 and FIG. 13(b), it is observed that a fine graphite (G) exists in the sorbitic pearlite (P) matrix, and eutectic cementite (C) is broken up into fine grains.

In ordinary cast iron series rolls, repeated bending stress and torsion stress under high temperature usage act upon the roll in many cases. In hot rolling rolls thermal stress due to repeated heating and cooling is developed, and therefore fine cracks are formed by a kind of fatigue fracture. During rolling, due to abrasion between the roll surface and rolling materials, the roll is gradually worn out. Thus the roll should have toughness against pressure, impact, temperature and wear during rolling. However in the ordinary various cast iron rolls, it is difficult to satisfy these conditions simultaneously.

The cast iron roll manufactured by the method of this invention has almost the same chemical composition as the usual cast iron roll, but it has a large toughness comparable to cast steel series rolls. Further it has a superior wear resistance which can not be obtained in cast steel series rolls, and its anticracking property is extremely large. Under particularly severe conditions (for example, where a cast steel series roll would be used in spite of its poor wear resistance in order to get great toughness or when roll breakage or breakage of the caliber part are apt to occur because of the deep, complicated shape of the caliber), the life of the roll of the invention is extremely prolonged due to its splendid characteristics.

The next several examples of actual application results of the cast iron roll of this invention and their methods of manufacturing are shown in the following:

TABLE 15

| Heat treatment | | Test sample No. | Tensile strength, kg./mn.$^2$ | Elongation, percent | Hardness, BHN | Microscopic structure |
|---|---|---|---|---|---|---|
| A | Annealing at 950° C. for 10 hours | 1 | 60.0 | 5.6 | 311 | Eutectic cementite ferrite, very fine graphite. |
| | | 2 | 60.3 | 7.2 | 302 | |
| | | 3 | 56.0 | 6.6 | 302 | |
| B | Keeping at 900° C. for 40 min. and air cooled | 1 | 81.6 | 3.2 | 415 | Eutectic cementite sorbitic pearlite, very fine graphite. |
| | Keeping at 630° C. for 60 min. and air cooled | 2 | 80.6 | 4.2 | 388 | |
| | Keeping at 180° C. for 60 min. and air cooled | 3 | 77.3 | 4.0 | 401 | |
| C | Keeping at 850° C. for 40 min. and oil cooled | 1 | 95.3 | 3.0 | 401 | Eutectic cementite sorbite, very very fine graphite. |
| | Keeping at 630° C. for 40 min. and air cooled | 2 | 97.8 | 4.3 | 444 | |
| | Keeping at 180° C. for 40 min. and air cooled | 3 | 96.8 | 3.7 | 444 | |

The hardness of the cast iron roll of this invention can be adjusted freely within certain limits by heat treatment.

In FIG. 11, FIG. 12, and FIG. 13, examples of microscopic structures (magnification 100) of the above samples are given. FIG. 11 shows an example of microscopic structure of the Test Sample No. 1 (the sample taken from the cast iron roll to which nickel and cobalt are added). In the figure (a) shows the structure of as-cast

PRACTICAL APPLICATION EXAMPLE 1

(1) Kind of roll produced: Three high roughing roll for hot rolling of shapes.

(2) Roll dimensions: Barrel diameter 680 mm. φ, barrel length 1,800 mm., total length 2,760 mm.

(3) Roll weight: 6,590 kg.
(4) Cast block shape: The cast block is cast in a 11 tons octagonal metal mould.
(5) Chemical composition (percent):

(6) Hot working temperature and forging ratio: 1,080° C.–960° C., 4.3 S.
(7) Heat treatment: Keeping at 900° C. for 5 hours and air cooled, keeping at 680° C. for 8 hours and air

TABLE 16

| Roll No. | C | Si | Mn | Cr | Mo | V | Ni | Co | Al | Ti | Zr | P | S | Cu | As | Sn | Pb | Zn | Sb | Bi | Total of detrimental elements |
|---|---|---|---|---|---|---|---|---|---|---|---|---|---|---|---|---|---|---|---|---|---|
| 1 | 1.93 | 0.65 | 0.57 | 1.32 | 0.26 | 0.23 | 1.53 | 0.03 | 0.021 | 0.007 |  | 0.009 | 0.011 | 0.028 | 0.008 | 0.010 | (1) | (1) | (1) | (1) | 0.066 |
| 2 | 1.91 | 0.65 | 0.83 | 1.29 | 0.41 | 0.008 | 2.27 | 0.05 | 0.019 | 0.008 | 0.151 | 0.009 | 0.008 | 0.029 | 0.007 | 0.007 | (1) | (1) | (1) | (1) | 0.060 |

[1] Traces.

(6) Hot working temperature and forging ratio:

TABLE 17

| Roll No. | Hot working temperature | Forging ratio |
|---|---|---|
| 1 | 1,090° C.–950° C. | 2.6 S |
| 2 | 1,090° C.–950° C. | 2.6 S |

(7) Heat treatment: Keeping at 900° C. for 10 hours and air cooled, keeping at 680° C. for 15 hours and air cooled, and keeping at 200° C. for 15 hours and air cooled.

(8) Mechanical properties:

TABLE 18

| Roll No.: | Tensile strength, kg./mm.$^2$ | Elongation, percent | Reduction of area, percent | Charpy impact value, kgm./cm.$^2$ | Hardness, BHN |
|---|---|---|---|---|---|
| 1 | 93.5 | 7.8 | 9.2 | 0.9 | 302 |
| 2 | 95.0 | 7.7 | 8.0 | 0.9 | 360 |

(9) Total rolling tonnage:

TABLE 19

| Roll No. | Total rolling tonnage (Unit ton) |
|---|---|
| 1 | 61,110 |
| 2 | 68,070 |

(10) Comparison between the rolls and the usual rolls: Compared with usual special cast steel roll (C: 1.03%, Cr: 0.98%, Mo: 0.30%) the roll No. 1 (this is the cast iron roll of this invention in which nickel and cobalt are added) had 3.1 times longer life, and the roll No. 2 (the cast iron roll of this invention to which nickel, cobalt and zirconium are added) had 3.5 times longer life.

PRACTICAL APPLICATION EXAMPLE 2

(1) Kind of roll produced: Three high medium roll for hot rolling of steel bars.
(2) Roll dimensions: Barrel diameter 330 mm. φ, barrel length 1,000 mm., the total length 1,570 mm.
(3) Roll weight: 820 kg.
(4) The cast block shape: The cast block is cast in a 5 tons octagonal metal mould.
(5) Chemical compositions (percent):

cooled, and keeping at 180° C. for 5 hours and air cooled.

(8) Mechanical properties:

Table 21

| | |
|---|---|
| Tensile strength (kg./mm.$^2$) | 83.0 |
| Elongation (percent) | 3.4 |
| Reduction of area (percent) | 2.5 |
| Charpy impact value (kg./cm.$^2$) | 0.6 |
| Hardness (BHN) | 321 |

(9) Total rolling tonnage: 62,850 tons.
(10) Comparison between the roll and the usual roll: Compared with usual spherical graphite cast iron roll (C: 3.15%, Si: 1.98%, Mn: 0.60%, Cr: 0.33%, Ni: 0.80%, Mo: 0.35%), the life of the roll was 2.5 times longer.

PRACTICAL APPLICATION EXAMPLE 3

(1) Kind of roll produced: Finishing roll for hot rolling of shapes.
(2) Roll dimensions: Barrel diameter 340 mm. φ, barrel length 1,000 mm., total length 1,570 mm.
(3) Roll weight: 1,040 kg.
(4) Cast block shape: The cast block is cast in a semi-chilled mould having a riser head of special cone shape.
(5) Chemical compositions (percent):

TABLE 22

| Roll No.: | C | Si | Mn | Cr | Mo | V | Ni | Co | Al | Ti | P | S | Cu | As | Sn | Pb | Zn | Sb | Bi | Total of detrimental elements |
|---|---|---|---|---|---|---|---|---|---|---|---|---|---|---|---|---|---|---|---|---|
| 1 | 3.00 | 0.51 | 0.61 | 1.78 | 0.29 | 0.009 | 3.94 | 0.11 | 0.015 | 0.005 | 0.009 | 0.008 | 0.010 | 0.008 | 0.008 | (1) | (1) | (1) | (1) | 0.043 |
| 2 | 3.21 | 0.54 | 0.61 | 1.02 | 0.36 | 0.007 | 0.04 |  | 0.028 | 0.055 | 0.010 | 0.010 | 0.022 | 0.008 | 0.008 | (1) | (1) | (1) | (1) | 0.058 |
| 3 | 2.96 | 0.64 | 0.87 | 1.20 | 0.43 | 0.13 | 1.63 | 0.03 | 0.031 | 0.051 | 0.008 | 0.007 | 0.027 | 0.007 | 0.007 | (1) | (1) | (1) | (1) | 0.056 |

[1] Traces.

(6) Hot working temperatures and forging ratio:

TABLE 23

| Roll No. | Hot working temperatures | Forging ratio |
|---|---|---|
| 1 | 1,080° C.–960° C. | 3.5 S |
| 2 | 1,090° C.–980° C. | 3.5 S |
| 3 | 1,070° C.–960° C. | 3.5 S |

(7) Heat treatment: Keeping at 900° C. for 5 hours and air cooled; keeping at 630° C. for 10 hours and air cooled, and keeping at 180° C. for 8 hours and air cooled.

TABLE 20

| C | Si | Mn | Cr | Mo | V | Al | Ti | P | S | Cu | As | Sn | Pb | Zn | Sb | Bi | Total of detrimental elements |
|---|---|---|---|---|---|---|---|---|---|---|---|---|---|---|---|---|---|
| 2.36 | 0.70 | 0.64 | 1.23 | 0.36 | 0.12 | 0.035 | 0.006 | 0.012 | 0.011 | 0.027 | 0.010 | 0.008 | (1) | (1) | (1) | (1) | 0.068 |

[1] Traces.

(8) Mechanical properties:

TABLE 24

| | Tensile strength, kg./mm.² | Elongation, percent | Reduction of area, percent | Charpy impact value, kgm./cm.² | Hardness, BHN |
|---|---|---|---|---|---|
| Roll No. | | | | | |
| 1 | 78.3 | 2.9 | 3.9 | 0.7 | 401 |
| 2 | 80.6 | 2.8 | 3.9 | 0.9 | 375 |
| 3 | 81.2 | 2.7 | 3.9 | 0.8 | 415 |

(9) Total rolling tonnage:

TABLE 25

| Roll No. | Total rolling tonnage (Unit ton) |
|---|---|
| 1 | 30,050 |
| 2 | 34,320 |
| 3 | 35,190 |

(10) Comparison between the rolls and the usual rolls: compared with usual alloy grain roll used (C: 3.02%, Si: 1.45%, Mn: 0.66%, Ni: 1.57%, Cr: 0.85%, Mo: 0.70%), roll No. 1 (cast iron roll of this invention with nickel and cobalt addition) showed 4.8 times longer life, roll No. 2 (cast iron roll of this invention having aluminium and titanium addition) showed 5.1 times longer life, and roll No. 3 (cast iron roll of this invention having nickel and cobalt, and aluminium and titanium simultaneous addition) showed 5.2 times longer life.

We have described above actual manufacturing as well as the manner of using this invention, however it is obvious that variations from these within the range and main process of the invention can be effected as are known among roll makers. Therefore such variations should be considered as belonging to the range of this invention.

We claim:

1. A method which comprises preparing a casting having a uniform white pig iron-like structure from an iron composition consisting essentially of from 1.7 to 3.8% carbon; less than 2.5% silicon; at least one alloying element selected from the group consisting of less than 1.0% manganese, less than 2.0% chromium, less than 2.0% molybdenum, less than 1.0% vanadium, and less than 1.0% tungsten; at least one mechanical property-improving material selected from the group consisting of less than 5% nickel and less than 5% cobalt; and a total content of the detrimental elements phosphorus, sulfur, copper, tin, arsenic, lead, antimony, bismuth and zinc below 0.20%, the balance being substantially iron, hot working the casting at a temperature of from 1125° to 900° C. after heating the casting to a temperature 50° lower than its solidus line, and tempering the hot-worked casting at 400° to 700° C.

2. The process of claim 1 wherein the detrimental element content is below 0.15%.

3. The process of claim 1 wherein the iron composition additionally contains at least one casting refining agent selected from the group consisting of less than 0.1% aluminium, less than 0.15% titanium, less than 0.30% zirconium, less than 0.10% boron, less than 0.20% beryllium, less than 0.05% tellurium, and less than 0.10% of the combination of columbium and tantalum.

4. The process of claim 1 in which the cementite in the casting is broken up into essentially uniform grains in the matrix by the hot working.

5. The process of claim 1 in which fine free graphite particles are produced in the matrix by the hot working.

6. The process of claim 1 wherein prior to tempering the hot-worked casting is machined to obtain a cylindrical configuration.

7. The process of claim 1 wherein prior to the tempering the hot-worked casting is annealed in the temperature range of from 750° to 850° C.

8. The process of claim 1 wherein prior to the tempering the hot-worked casting is quenched with a quenching agent selected from the group of water and oil after the hot-worked casting has been held at from 850° to 950° C.

9. The process of claim 1 wherein prior to the tempering the hot-worked casting is normalized after the hot-worked casting has been held at from 850° to 950° C.

10. The process of claim 1 wherein the tempering is followed by stress-relieving the hot-worked casting at a temperature of from 150° to 250° C.

11. A method which comprises preheating a casting having a uniform white pig iron-like structure from an iron composition consisting essentially of from 1.7 to 3.8% carbon; less than 2.5% silicon; at least one alloying element selected from the group consisting of less than 1.0% manganese, less than 2.0% chromium, less than 2.0% molybdenum, less than 1.0% vanadium, and less than 1.0% tungsten; at least one mechanical property-improving material selected from the group consisting of less than 5% nickel and less than 5% cobalt; at least one casting refining agent selected from the group consisting of less than 0.10% aluminium, less than 0.15% titanium, less than 0.30% zirconium, less than 0.10% boron, less than 0.20% beryllium, less than 0.05% tellurium and less than 0.10% of the combination of columbium and tantalum; and a total content of the detrimental elements phosphorus, sulfur, copper, tin, arsenic, lead, antimony, bismuth and zinc below 0.20%, the balance being essentially iron; hot working the casting by forging at a temperature from 1125° C. to 900° C. after heating the casting to a temperature 50° C. lower than its solidus line; and tempering the hot-worked casting at 400° to 700° C.

References Cited

UNITED STATES PATENTS

| 1,211,826 | 1/1917 | Daniels | 75—123 |
| 1,762,109 | 6/1930 | Taylor et al. | 75—123 |
| 2,241,270 | 5/1941 | Nipper | 148—12 X |
| 2,250,488 | 7/1941 | Lorig et al. | 75—123 X |
| 2,253,502 | 8/1941 | Boegehold | 75—123 |
| 2,450,395 | 9/1948 | Eckman et al. | 75—123 |
| 2,633,438 | 3/1953 | Uhle | 148—138 X |
| 2,901,386 | 8/1959 | Saives | 75—123 X |

OTHER REFERENCES

Metals Handbook, 1961, Published by ASM, relied on pages 394–396.

CHARLES N. LOVELL, *Primary Examiner.*